(12) United States Patent
Chang

(10) Patent No.: US 12,421,894 B2
(45) Date of Patent: Sep. 23, 2025

(54) AIR-STORAGE SYSTEM

(71) Applicant: Tien-Ming Chang, Wandan Township (TW)

(72) Inventor: Tien-Ming Chang, Wandan Township (TW)

( * ) Notice: Subject to any disclaimer, the term of this patent is extended or adjusted under 35 U.S.C. 154(b) by 0 days.

(21) Appl. No.: 18/776,988

(22) Filed: Jul. 18, 2024

(65) Prior Publication Data
US 2025/0122832 A1 Apr. 17, 2025

(30) Foreign Application Priority Data
Oct. 12, 2023 (TW) ................................ 112138907

(51) Int. Cl.
*F02C 6/16* (2006.01)
*F02C 1/10* (2006.01)

(52) U.S. Cl.
CPC ................ *F02C 6/16* (2013.01); *F02C 1/105* (2013.01); *F05D 2260/42* (2013.01)

(58) Field of Classification Search
CPC .. F03D 80/80; F03D 9/17; F03D 9/28; H02K 7/183; Y02E 10/72; F02C 6/16; F02C 1/105; F05D 2260/42
See application file for complete search history.

(56) References Cited

U.S. PATENT DOCUMENTS

| | | | | |
|---|---|---|---|---|
| 8,338,976 B2* | 12/2012 | Kazadi | .................... | F03D 80/70 |
| | | | | 290/44 |
| 2021/0164438 A1* | 6/2021 | Chang | .................... | F03D 3/061 |
| 2024/0068446 A1* | 2/2024 | Chang | .................... | F03D 80/80 |

FOREIGN PATENT DOCUMENTS

| CN | 104832375 A | 8/2015 |
|---|---|---|
| CN | 115898778 A | 4/2023 |
| JP | 2016-516922 A | 6/2016 |
| TW | M637913 | 2/2023 |
| TW | M637913 U | 2/2023 |
| TW | M639893 U | 4/2023 |
| WO | WO 2023/166504 A1 | 9/2023 |

OTHER PUBLICATIONS

Search Report of Patent Application No. 112138907, Oct. 12, 2023.

\* cited by examiner

*Primary Examiner* — Shafiq Mian
(74) *Attorney, Agent, or Firm* — Muncy, Geissler, Olds & Lowe, P.C.

(57) ABSTRACT

An air-storage system includes air-storage units that are in fluid communication with each other, that are in fluid communication with an air-actuated power generating system, that cooperatively enclose the air-actuated power generating system, and that cooperatively define a work area for placement of the air-actuated power generating system. Each of the air-storage units includes at least one air-storage subunit and a plurality of supporting subunits that support the at least one air-storage subunit. The at least one air-storage subunit of each of the air-storage units includes a plurality of first air-storage pipes that are colinearly arranged, that are connected to and in fluid communication with each other, and that are adapted to store pressurized air.

4 Claims, 6 Drawing Sheets

AIR-STORAGE SYSTEM

CROSS-REFERENCE TO RELATED APPLICATION

This application claims priority to Taiwanese Invention Patent Application No. 112138907, filed on Oct. 12, 2023, the entire disclosure of which is incorporated by reference herein.

FIELD

The disclosure relates to an air-storage system, and more particularly to an air-storage system adapted to be connected to an air-actuated power generating system.

BACKGROUND

FIG. 1 illustrates an air-actuated power generating system 1, as disclosed in Taiwanese Utility Model Patent No. M637913 that is applied by the same applicant of the present disclosure.

The air-actuated power generating system 1 includes an air storage device 11 to store pressurized air, a housing assembly 12 rotatably mounted on the air storage device 11, an air compressor 13 disposed within the housing assembly 12, a vane assembly 14 disposed on the housing assembly 12 and connected to the air compressor 13, and a power generating device 15 connected to the air storage device 11.

The vane assembly 14 drives the air compressor 13 to compress air into pressurized air. The pressurized air resulting from the air compressor 13 is stored within the air storage device 11. When there is a need of electricity or power generation, the power generating device 15 will be driven by the pressurized air stored within the air storage device 11 to generate electricity. The air-actuated power generating system 1 is featured in that the stored pressurized air after being used to generate electricity can be directly discharged without causing pollution and producing waste, which is environmentally friendly.

However, in order to store a large amount of pressurized air, the air storage device 11 has to be modified. In addition, if a work area of the air-actuated power generating system 1 is not enclosed or fenced, ordinary people may mistakenly enter the work area of the air-actuated power generating system 1 when the air-actuated power generating system 1 is operated. Consequently, there is room for improvement.

SUMMARY

Therefore, an object of the disclosure is to provide an air-storage system that can alleviate at least one of the drawbacks of the prior art.

According to the disclosure, the air-storage system is adapted to be connected to an air-actuated power generating system and includes a plurality of first air-storage units that are in fluid communication with each other, that are adapted to be in fluid communication with the air-actuated power generating system, that are adapted to cooperatively enclose the air-actuated power generating system, and that cooperatively define a work area adapted for placement of the air-actuated power generating system. Each of the first air-storage units includes at least one air-storage subunit and a plurality of supporting subunits that support the at least one air-storage subunit. The at least one air-storage subunit of each of the first air-storage units includes a plurality of first air-storage pipes that are colinearly arranged, that are connected to and in fluid communication with each other, and that are adapted to store pressurized air.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
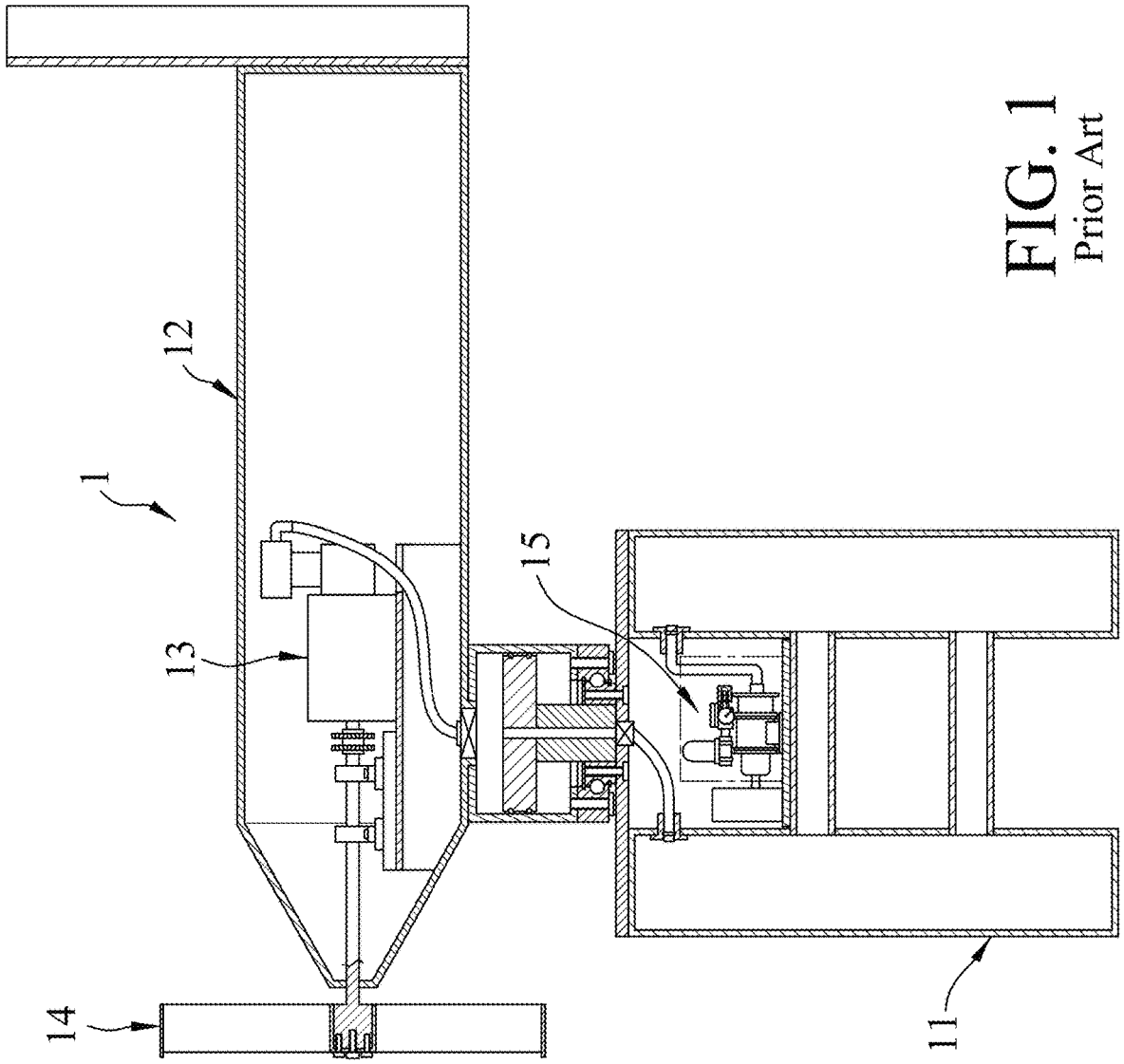
FIG. 1 is a schematic sectional view of an existing air-actuated power generating system.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
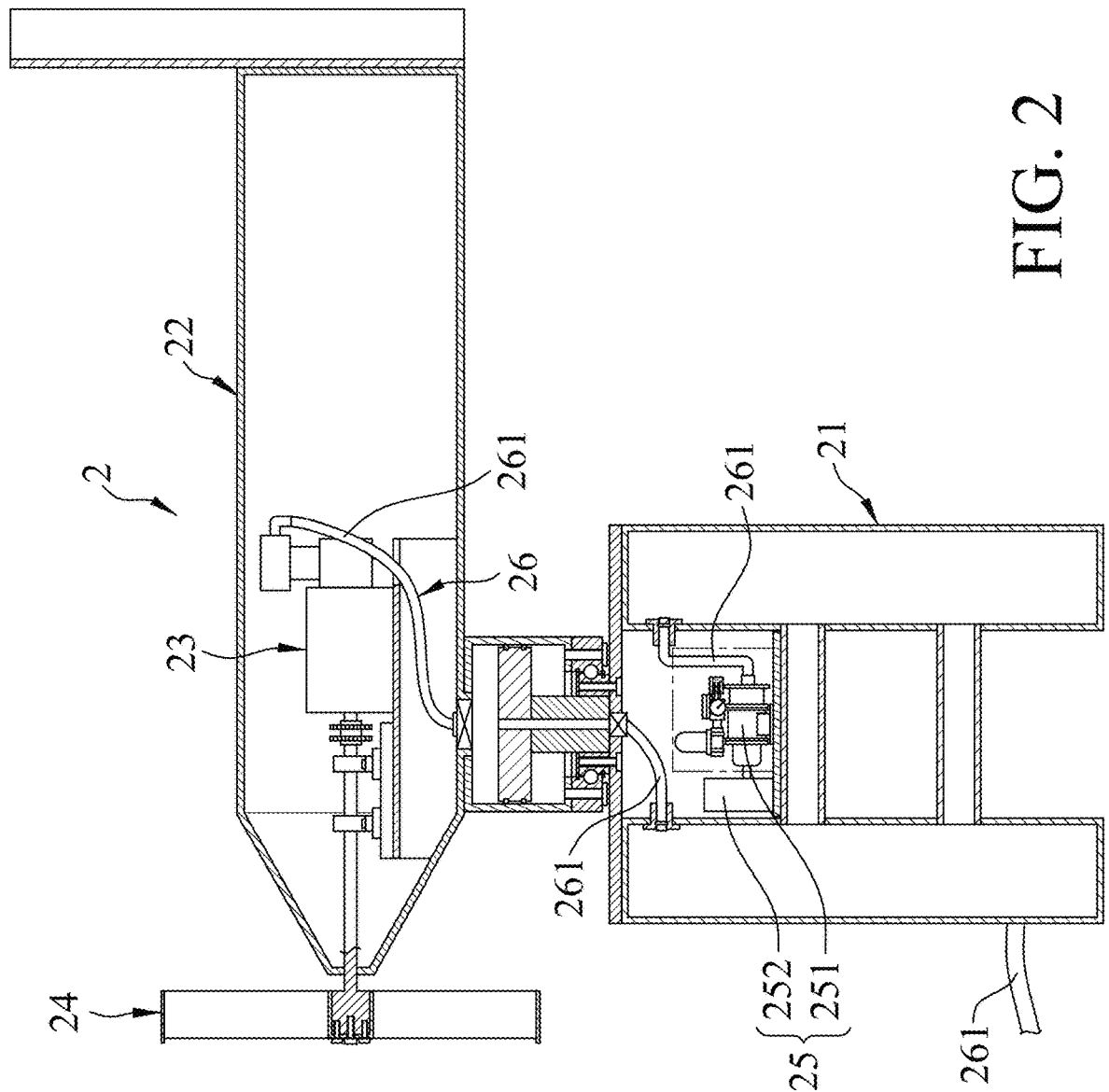
FIG. 2 is a fragmentary schematic sectional view of an air-actuated power generating system adapted to cooperate with an air-storage system of the disclosure.
Figure 3:
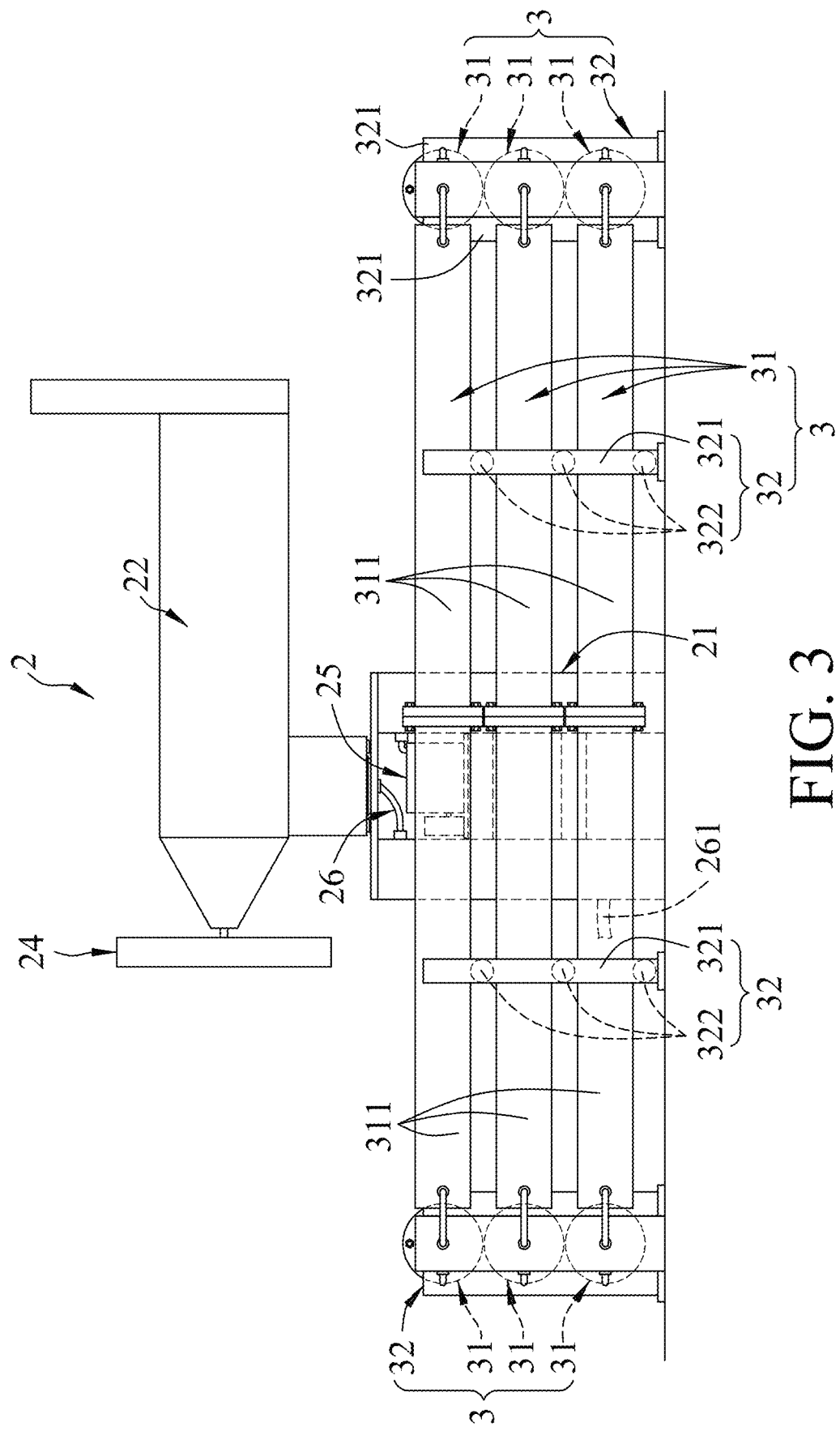
FIG. 3 is a side view illustrating an air-storage system according to a first embodiment of the disclosure connected to the air-actuated power generating system.
Figure 4:
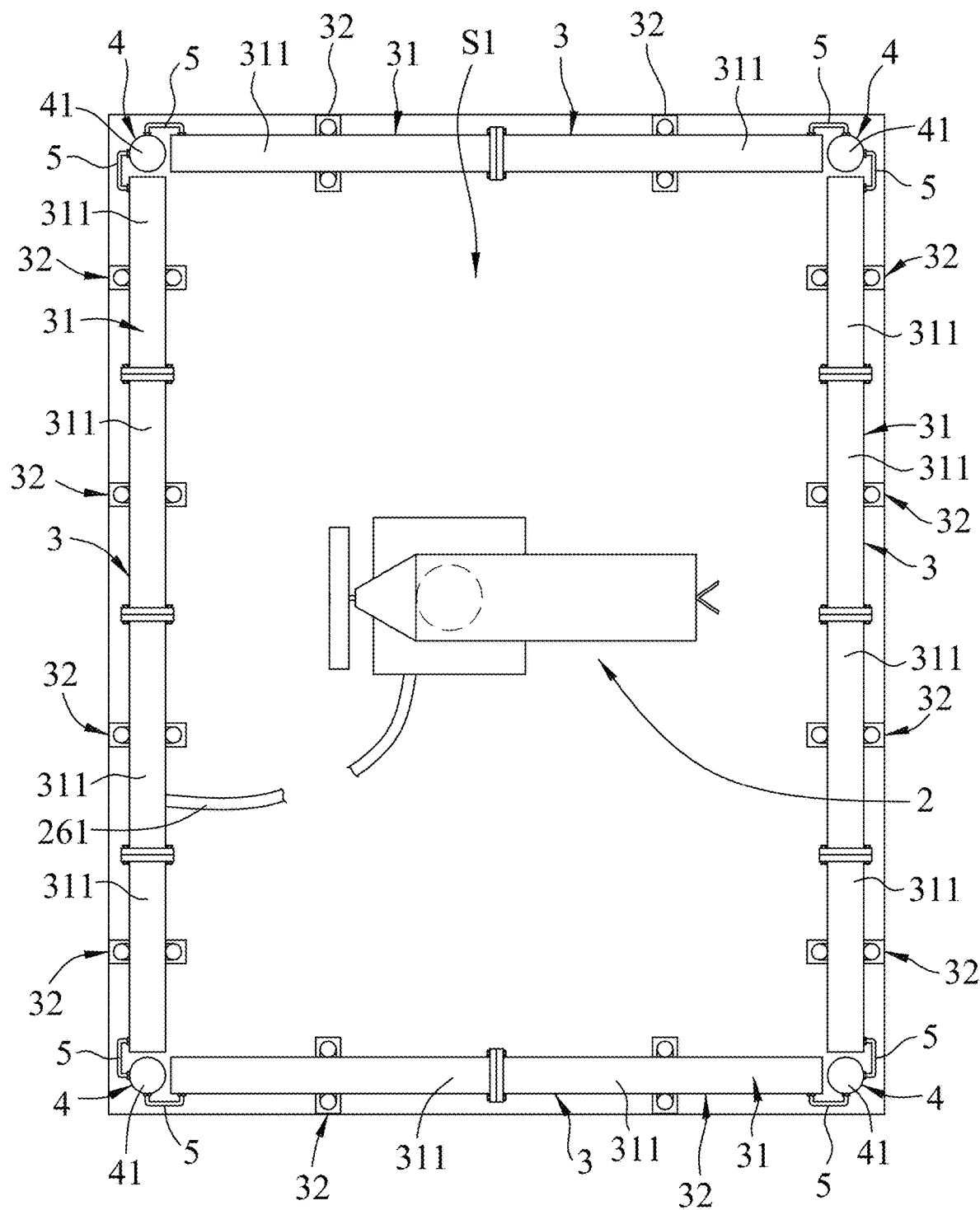
FIG. 4 is a fragmentary top view of the first embodiment.

FIGS. 2 to 4 illustrate an air-storage system according to a first embodiment of the disclosure that is adapted to be connected to an air-actuated power generating system 2 (see FIG. 2).

As shown in FIG. 2, the air-actuated power generating system 2 includes an air storage device 21 to store pressurized air, a housing assembly 22 rotatably mounted on the air storage device 21, an air compressor 23 disposed within the housing assembly 22, a vane assembly 24 disposed on the housing assembly 22 and connected to the air compressor 23, a power generating device 25 connected to the air storage device 21, and an air-delivery device 26.

The vane assembly 24 drives the air compressor 23 to compress air into pressurized air. The power generating device 25 includes an air-actuated motor 251 fluidly communicating with the air storage device 21, and a power generator 252 driven by the air-actuated motor 251 to operate. The air-actuated motor 251 is operated by the pressurized air, thereby driving the power generator 252 to generate electricity. The air-delivery device 26 includes a plurality of delivery tubes 261 in fluid communication with the air storage device 21, the air compressor 23, and the power generating device 25. The air-storage system of the disclosure is fluidly communicated with the air storage device 21 by a corresponding one of the delivery tubes 261.

Figure 5:
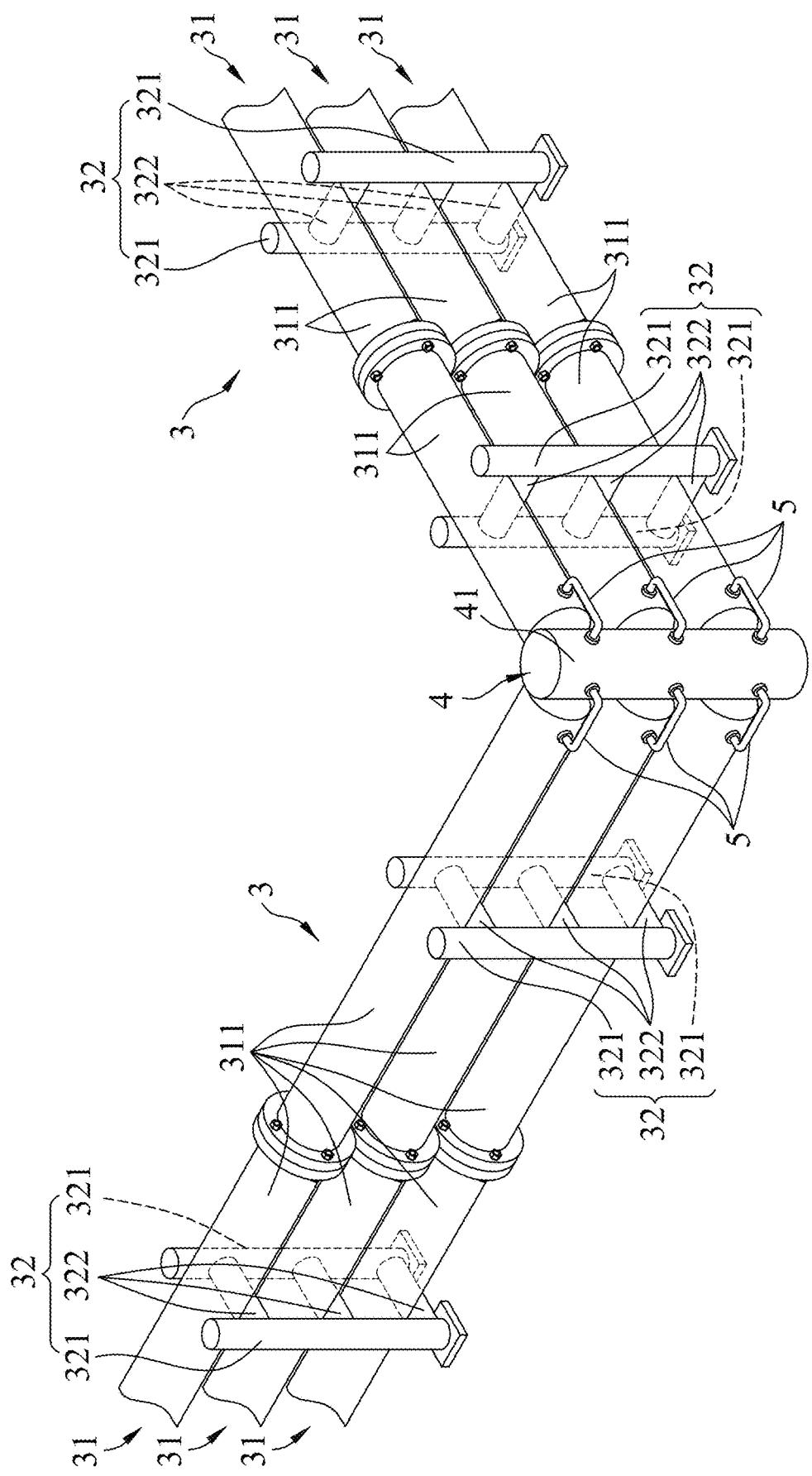
FIG. 5 is a fragmentary perspective view illustrating the air-storage system of the first embodiment.

Referring to FIG. 5 in combination with FIGS. 3 and 4, the air-storage system of the disclosure includes a plurality of first air-storage units 3 and a plurality of second air-storage units 4.

The first air-storage units 3 are in fluid communication with each other, are adapted to be in fluid communication with the air-actuated power generating system 2, are arranged in a rectangular form to cooperatively enclose the air-actuated power generating system 2, and cooperatively define a work area (S1) that is adapted for placement of the air-actuated power generating system 2 as shown in FIG. 4.

Each of the first air-storage units 3 includes a plurality of air-storage subunits 31 that are arranged in a top-bottom direction, and a plurality of supporting subunits 32 that support the air-storage subunits 31.

Each of the air-storage subunits 31 of each of the first air-storage units 3 includes a plurality of first air-storage pipes 311 that are colinearly arranged, that are in fluid communication with each other, and that are connected to each other by flanges to achieve a firm connection between each other.

In this embodiment, one of the first air-storage pipes 311 of one of the air-storage subunits 31 of one of the first air-storage units 3 is in fluid communication with the air storage device 21 of the air-actuated power generating system 2 by the corresponding delivery tube 261. In some variant embodiments, the air storage device 21 may be in fluid communication with one of the first air-storage pipes 311 of each of the air-storage subunits 31 of each of the first air-storage units 3, or may be in fluid communication with the first air-storage pipes 311 of each of the air-storage subunits 31 of each of the first air-storage units 3.

The first air-storage pipes 311 of each of the air-storage subunits 31 of each of the first air-storage units 3 are adapted to store pressurized air. The pressurized air may be at a pressure greater than one atmosphere. Specifically, in order to be effectively stored and utilized, the pressurized air is at a pressure ranging from 10 kg/cm$^2$ to 30 kg/cm$^2$. The pressurized air is optimum at a pressure of 20 kg/cm$^2$.

For each of the first air-storage units 3, each of the supporting subunits 32 includes two supporting rod members 321 and a plurality of transverse rods 322. The supporting rod members 321 are elongated in the top-bottom direction, are spaced apart from each other, and are disposed respectively at opposite sides of the air-storage subunits 31. The transverse rods 322 interconnect the supporting rod members 321, are spaced apart from each other in the top-bottom direction, and respectively support the first air-storage pipes 311 of the air-storage subunits 31.

Each of the second air-storage units 4 is disposed between a respective adjacent pair of the first air-storage units 3 and is in fluid communication with the air-storage subunits 31 of the respective adjacent pair of the first air-storage units 3, such that for each of the first air-storage units 3, the air-storage subunits 31 are in fluid communication with each other via the second air-storage units 4, and the first air-storage units 3 are in fluid communication with each other. In this embodiment, because the first air-storage units 3 are arranged in the rectangular form, each of the second air-storage units 4 is located at a corner formed between the respective adjacent pair of the first air-storage units 3.

Each of the second air-storage units 4 includes at least one second air-storage pipe 41 that is elongated in the top-bottom direction and that is in fluid communication with the air-storage subunits 31 of the respective adjacent pair of the first air-storage units 3. In this embodiment, the second air-storage pipe 41 of each of the second air-storage units 4 fluidly communicates with the first air-storage pipes 311 of the air-storage subunits 31 of the respective adjacent pair of the first air-storage units 3 via a plurality of communicating tubes 5 (see FIG. 5). As shown in FIGS. 3 and 4, by virtue of the corresponding delivery tube 261 and one of the first air-storage pipes 311 of one of the air-storage subunits 31 of one of the first air-storage units 3 in fluid communication with each other, the air storage device 21, the first air-storage pipes 311, and the second air-storage pipe 41 of each of the second air-storage units 4 are in fluid communication with each other.

The air-storage system according to the first embodiment of the disclosure is featured in that the air-storage subunits 31 may serve as fences to prevent ordinary people from entering the work area (S1), thereby increasing safety during the operation of the air-actuated power generating system 2. In addition, each of the first air-storage pipes 311 of the air-storage subunits 31 of the first air-storage units 3 stores pressurized air, such that a large amount of pressurized air can be stored for energy conversion.

Figure 6:
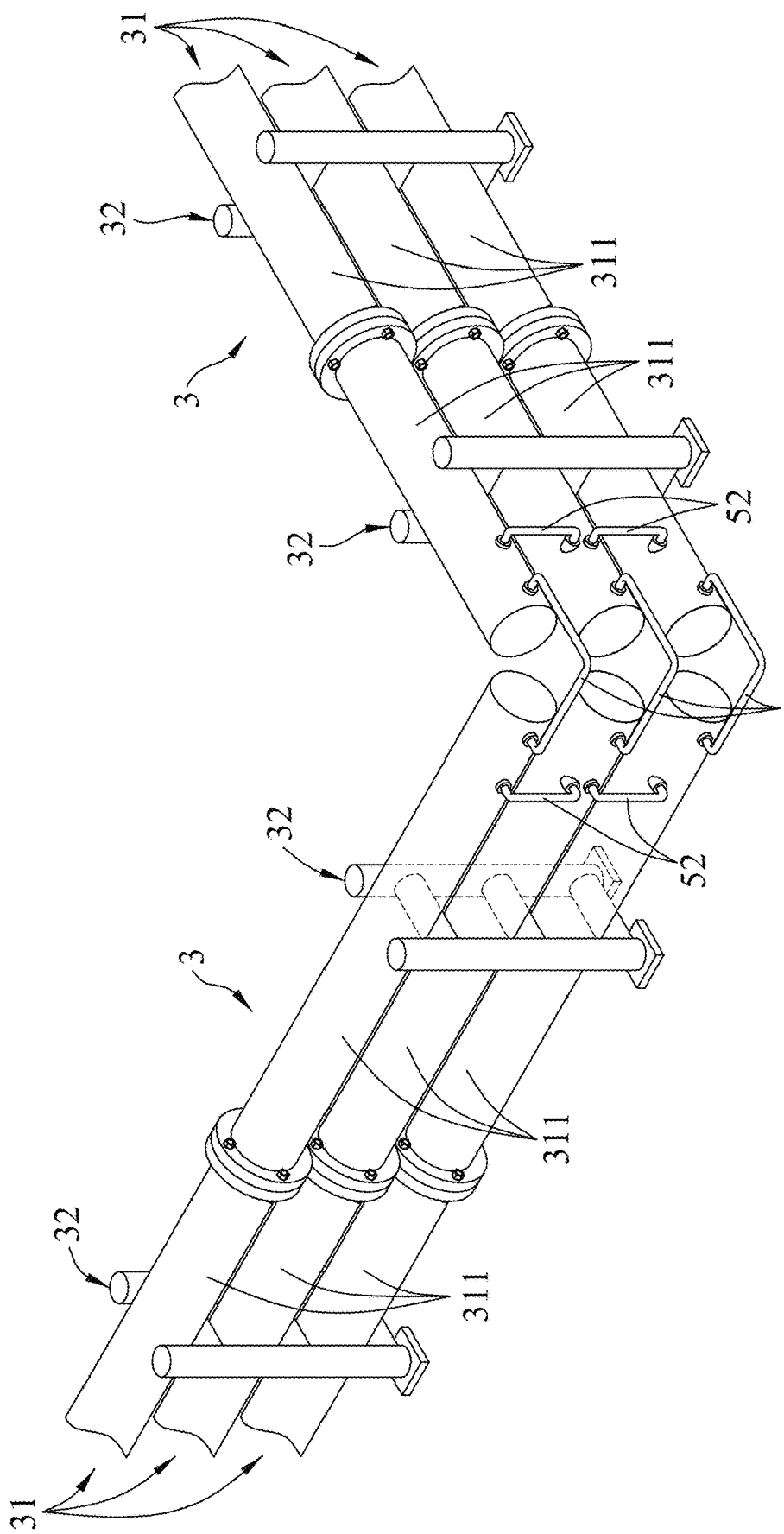
FIG. 6 is a fragmentary perspective view illustrating an air-storage system according to a second embodiment of the disclosure.

FIG. 6 illustrates an air-storage system according to a second embodiment of the disclosure, which has a structure generally similar to that of the first embodiment. However, in the second embodiment, the second air-storage units 4 are omitted. In the second embodiment, for the adjacent pairs of the first air-storage units 3, the first air-storage pipes 311 of the air-storage subunits 31 at the same height are in fluid communication with each other by a plurality of transverse communicating tubes 51. For each of the first air-storage units 3, the first air-storage pipes 311 of the air-storage subunits 31 arranged in the top-bottom direction are in fluid communication with each other by a plurality of top-bottom communicating tubes 52.

In summary, the first air-storage units 3 may function as fences to prevent ordinary people from entering the work area (S1), thereby increasing safety during the operation of the air-actuated power generating system 2. In addition, each of the first air-storage pipes 311 of the air-storage subunits 31 of the first air-storage units 3 stores pressurized air, such that a large amount of pressurized air can be stored for energy conversion.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An air-storage system configured to cooperate with a power generating system to generate electricity by using pressurized air, and comprising:
    a plurality of first air-storage units that are in gaseous communication with each other, that are configured to be in gaseous communication with the power generating system,
    wherein said plurality of first air-storage units cooperatively surround and define a work area configured for placement of the power generating system, each of said first air-storage units including at least one air-storage subunit and a plurality of supporting subunits which cooperatively support said at least one air-storage subunit, each of said at least one air-storage subunit including a plurality of first air-storage pipes which are transversely elongated and which are coaxially in gaseous communication with each other, said at least one air-storage subunit being configured to store pressurized air.

2. The air-storage system as claimed in claim 1, wherein:
    each of said first air-storage units includes a plurality of air-storage subunits arranged from top to bottom;
    said air-storage system further comprises a plurality of second air-storage units; and
    each of said second air-storage units is disposed between two corresponding ones of said first air-storage units and is in gaseous communication with said air-storage subunits of said two corresponding ones of said first air-storage units, wherein for each of said first air-storage units, said air-storage subunits are in gaseous communication with each other via said second air-storage units, and said first air-storage units are in gaseous communication with each other.

3. The air-storage system as claimed in claim 2, wherein each of said second air-storage units includes at least one second air-storage pipe which is elongated uprightly and which is in gaseous communication with said air-storage subunits of said two corresponding ones of said first air-storage units.

4. The air-storage system as claimed in claim 2, wherein each of said supporting subunits includes:
    two first supporting rod members which are elongated from the top to the bottom, and which are transversely spaced apart from each other; and
    a plurality of second supporting rod members which are transversely elongated, which interconnect said first supporting rod members, and which are spaced apart from each other from the top to the bottom, each of said second supporting rod members supporting a respective one of said first air-storage pipes.

* * * * *